(12) United States Patent
Sah et al.

(10) Patent No.: US 8,733,481 B2
(45) Date of Patent: May 27, 2014

(54) METHOD FOR STARTING AN ENGINE OF A HYBRID POWERTRAIN

(75) Inventors: Jy-Jen F. Sah, West Bloomfield, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 811 days.

(21) Appl. No.: 12/729,276

(22) Filed: Mar. 23, 2010

(65) Prior Publication Data

US 2011/0238244 A1 Sep. 29, 2011

(51) Int. Cl.
*B60W 10/04* (2006.01)
*B60L 9/00* (2006.01)

(52) U.S. Cl.
USPC .............. 180/65.265; 180/65.28; 180/65.285; 701/22

(58) Field of Classification Search
None
See application file for complete search history.

(56) References Cited

U.S. PATENT DOCUMENTS

| 5,934,395 | A  | * | 8/1999  | Koide et al.     | 180/65.235 |
|-----------|----|---|---------|------------------|------------|
| 2004/0204286 | A1 | * | 10/2004 | Stridsberg       | 477/14     |
| 2008/0093137 | A1 | * | 4/2008  | Maeda et al.     | 180/65.2   |
| 2008/0132378 | A1 | * | 6/2008  | Bouchon          | 477/3      |
| 2008/0196954 | A1 | * | 8/2008  | Soliman et al.   | 180/65.2   |
| 2008/0261770 | A1 | * | 10/2008 | Tabata et al.    | 477/5      |
| 2009/0071733 | A1 | * | 3/2009  | Duan et al.      | 180/65.21  |
| 2010/0035715 | A1 | * | 2/2010  | Ortmann et al.   | 475/5      |
| 2010/0049390 | A1 | * | 2/2010  | Supina et al.    | 701/22     |
| 2010/0276218 | A1 | * | 11/2010 | Thompson et al.  | 180/65.28  |

* cited by examiner

*Primary Examiner* — M. Thein
(74) *Attorney, Agent, or Firm* — Quinn Law Group, PLLC

(57) ABSTRACT

A method of operating a hybrid powertrain includes commanding an engine start of an engine configured to operate at approximately zero engine speed. A spooling phase includes accelerating the first electric machine with the first machine torque, such that the first electric machine begins rotating. The first machine speed increases in magnitude from zero to non-zero, but engine speed is maintained at approximately zero. The mechanical energy of the rotating first electric machine is stored. A transfer phase includes commanding an increase in magnitude of the first machine torque and decelerating the first electric machine, such that the first machine speed decreases. The stored mechanical energy of the first electric machine is transferred to the engine to increase the engine speed to greater than zero, such that the engine starts.

8 Claims, 5 Drawing Sheets

METHOD FOR STARTING AN ENGINE OF A HYBRID POWERTRAIN

TECHNICAL FIELD

This disclosure relates to methods for starting an internal combustion engine in a hybrid powertrain.

BACKGROUND OF THE DISCLOSURE

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle.

The electric machines convert kinetic energy into electric energy which may be stored in an energy storage device. The electric energy from the energy storage device may then be converted back into kinetic energy for propulsion of the vehicle. Electric vehicles also include one or more electric machines and energy storage devices used to propel the vehicles.

SUMMARY

A method of operating a hybrid powertrain is provided. The powertrain includes a battery, an engine operating at an engine speed, and a first electric machine operating at a first machine torque and first machine speed. The method includes commanding an engine start of the engine operating at approximately zero engine speed.

The method includes commanding a spooling phase, including accelerating the first electric machine with the first machine torque, such that the first electric machine begins rotating. The first machine speed increases in magnitude from zero to non-zero. Engine speed is maintained at approximately zero during the spooling phase. The mechanical energy of the rotating first electric machine is stored.

The method includes commanding a transfer phase, including commanding an increase in magnitude of the first machine torque and decelerating the first electric machine, such that the first machine speed moves toward zero. The stored mechanical energy of the first electric machine is transferred to the engine to increase the engine speed to greater than zero.

Increasing the engine speed starts the engine. The method may include balancing power output of the hybrid powertrain during the transfer phase by one of charging the battery and discharging the battery.

The above features and advantages and other features and advantages of the present invention, as identified in the claims, are readily apparent from the following detailed description of the best modes and other embodiments for carrying out the invention when taken in connection with the accompanying drawings.

DESCRIPTION OF PREFERRED EMBODIMENTS

Figure 1:
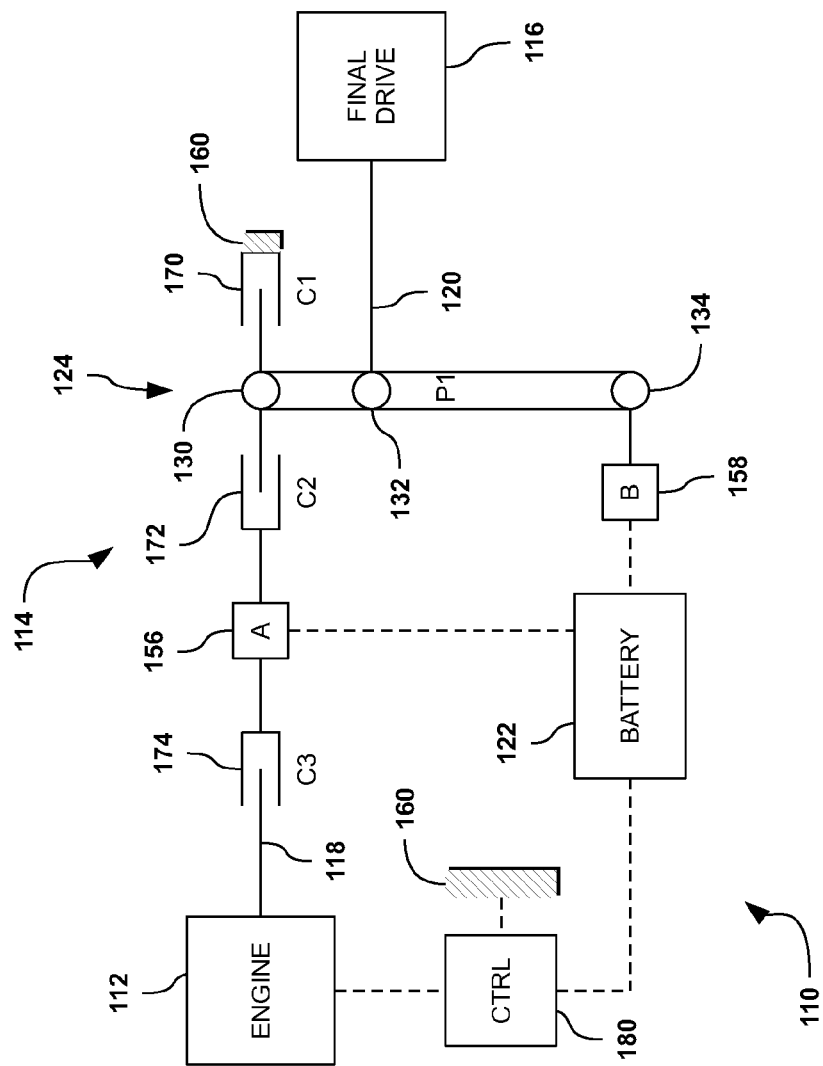
FIG. 1 is a schematic lever diagram illustration of an exemplary hybrid vehicle powertrain having two electric machines and one planetary gear set.

Referring to the drawings, wherein like reference numbers correspond to like or similar components throughout the several figures, there is shown in FIG. 1 a lever diagram depiction of an exemplary vehicle powertrain system, designated generally as 110. The powertrain 110 includes an internal combustion engine 112 selectively, drivingly connected to a hybrid transmission 114. The transmission 114 may be a multi-mode, electrically-variable transmission, and is in power flow communication with a final drive system 116.

A lever diagram is a schematic representation of the components of a mechanical device, such as an automatic transmission. Each individual lever represents a planetary gear set, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gear set. These lever ratios, in turn, are used to vary the gear ratios of the transmission in order to achieve appropriate ratios and ratio progression.

Mechanical couplings or interconnections between the nodes of the various planetary gear sets and other components of the transmission (such as motor/generators) are illustrated by thin, horizontal lines. Torque transmitting mechanisms or torque transfer devices, such as clutches and brakes, are presented as interleaved fingers. If the mechanism is a brake, one set of the fingers is grounded.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The transmission 114 is designed to receive a portion of its driving power from the engine 112 via an input member 118. The transmission input member 118 may be the engine output shaft (also referred to as a crankshaft). The input member 118 transfers power to the transmission 114, which distributes power and torque through an output shaft 120 to the final drive system 116 to propel the vehicle (not shown). A battery 122 acts as an energy storage device for the powertrain 110 and may be a chemical battery, battery pack, or another energy storage device recognizable to those having ordinary skill in the art.

In the exemplary embodiment described herein, wherein the hybrid powertrain 110 is used as a land vehicle, the transmission output shaft 120 is operatively connected to the final drive system 116 (or driveline). The final drive system 116 may include a front or rear differential, or other torque transmitting mechanism, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system 116 may include any known configuration, including front-wheel drive (FWD), rear-wheel drive (RWD), four-wheel drive (4WD), or all-wheel drive (AWD), without altering the scope of the claimed invention.

The powertrain 110 utilizes at least one differential gear arrangement, such as an epicyclic planetary gear set, a first planetary gear set 124 (P1). P1 includes first, second and third gear members.

The first planetary gear set 124 (P1) has three gear members: a first gear member 130, a second gear member 132, and a third gear member 134. In the configuration shown in FIG. 1, the first gear member 130 is a ring gear, and circumscribes the third gear member 134 which is a sun gear. The second gear member 132 is a planet carrier member. A plurality of pinion gears are rotatably mounted on the planet carrier, second gear member 132. Each pinion gear is meshingly engaged with both the ring gear, first gear member 130, and the sun gear, third gear member 134. Each of the first, second, and third gear members 130, 132, 134 may be any one of the gear elements—ring gear, sun gear, or planet carrier—as would be recognized by those having ordinary skill in the art. The first, second and third gear members of P1 may be identified as "first" to "third" in any order in the drawings (e.g., top to bottom, bottom to top).

In the configuration of transmission 114 shown in FIG. 1, P1 is a simple planetary gear set. However, may be either a single-pinion (simple) carrier assembly or a double-pinion (compound) carrier assembly. Embodiments with long pinions are also possible.

A first motor/generator or first electric machine 156, which may be interchangeably referred to herein as motor A, is disposed between the engine 112 and the first gear member 130 of P1. The first electric machine 156 is an electric machine capable of converting kinetic energy into electric energy and of converting electric energy into kinetic energy. The third gear member 134 of the P1 is continuously connected to a second motor/generator or second electric machine 158, which may be interchangeably referred to herein as motor B.

The transmission 114 includes three torque transmitting mechanisms. In the exemplary embodiment depicted in FIG. 1, the torque transmitting mechanisms are friction clutches. However, other conventional clutch configurations may be employed, such as dog clutches, rocker clutches, and others recognizable to those having ordinary skill in the art. The clutches may be hydraulically actuated, receiving pressurized hydraulic fluid from a pump (not shown). Torque transmitting mechanisms acting as brakes may be selectively connected to a static element of the powertrain 110, such as a transmission housing 160 of the transmission 114.

A first torque transmitting mechanism 170—which may be interchangeably referred to as clutch C1—selectively connects the first gear member 130 with a stationary member, represented in FIG. 1 by transmission housing 160. The first gear member 130 is also selectively connectable to the first electric machine 156 through the selective engagement of a second torque transmitting mechanism 172—which may be interchangeably referred to as clutch C2. A third torque transmitting mechanism 174—which may be interchangeably referred to as clutch C3—selectively connects the first electric machine 156 to the engine 112.

A controller 180 is in communication with some or all elements of the powertrain 110 and effects control over the powertrain 110. The controller 180 has a distributed controller architecture, which may be a microprocessor-based electronic control unit (ECU). The controller 180 includes a storage medium with a suitable amount of programmable memory, and is capable of storing and executing one or more algorithms to effect control of the powertrain 110. The controller 180 may include multiple control modules or components in communication with each other and the powertrain 110. The controller 180 may further be configured to execute algorithms or tasks other than those described herein.

The engine 112, first electric machine 156, and second electric machine 158 may operate individually or in concert with the first planetary gear set (P1) and selectively-engageable torque-transmitting mechanisms, clutches C1-C3, to rotate the transmission output shaft 120.

The engine 112 requires the pistons to be moving before the ignition phase of the cycle. This means that the engine 112 must be set in motion (spinning) by an external force before it can power itself. Starting the engine 112 may be effected in several ways. If the powertrain 110 includes a starter motor (not shown) and a starting, lighting, and ignition (SLI) battery, the starter motor (powered by the SLI battery) may be used to spin the engine 112 up to starting speed. This type of start may be referred to herein as an SLI start.

In the hybrid powertrain 110 shown in Figure, the first electric machine 156 may be used to spin the engine 112 while clutch C3 is engaged. Therefore, power from the battery 122 may be used to quickly accelerate the first electric machine 156 and engine 112 through the application of sufficient torque. This type of start, which may be referred to herein as an immediate start, requires relatively high power flow from the battery 122—as would the SLI start. The powertrain 110 may be configured such that the battery 122 has a power constraint, beyond which the controller 180 will not allow power flow from the battery 122.

A further method of starting the internal combustion engine 112 utilizes the first electric machine 156 and/or the second electric machine 158, but does so in a manner that requires relatively less power from the battery 122. This start may be referred to as an inertia start, and may be executed when the controller 180 determines that conditions are favorable for the inertia start. Inertia starts may be utilized as the only starting method of the powertrain 110, or as an available alternative to either the SLI start, the immediate start, or both.

The engine 112 may be described as operating at an engine speed, and the first electric machine 156 may be described as operating at a first machine torque and a first machine speed. Any specific torque transmitting mechanism (clutch C1, C2, or C3) may be described as operating at a first slip speed. Slip speed is the relative rotation of the two selectively connectable elements across the torque transmitting mechanism, such that a fully-engaged clutch has zero slip speed. Clutch synchronization generally refers to bringing the slip speed of the individual clutch to at, or near, zero.

When a command is received to start the engine 112, the engine speed is approximately zero due to engine friction and vacuum within the cylinders. The controller 180 commands a spooling phase of the inertia start. The spooling phase includes accelerating either the first electric machine 156 or the second electric machine 158 with a lower amount of torque (a first machine torque) than the amount of torque that would be initially required to execute the immediate start. For the first electric machine 156, the first machine torque (TA) is related to angular acceleration by the formula: TA=IA*NAdot; where IA is the moment of inertia of the first electric machine 156 and NAdot is the rotational acceleration of the first electric machine 156. Those having ordinary skill in the art will recognize that this formula, and others expressed herein, may be applied in a similar fashion to either electric machine.

The inertia start may include building and storing energy with the second electric machine 158—operating at a second machine torque and second machine speed—either alone or in combination with the first electric machine 156. Application of the first machine torque causes, in this example, the second electric machine 158 to begin rotating and the speed of the second electric machine 158 to change from approximately zero speed to a non-zero speed.

Depending on the direction of rotation, speed change may be considered either an increase (to a positive speed) or a decrease (to a negative speed), but is always an increase in the magnitude of the rotation speed. In this example, the clutch C3 may be locked (zero slip speed) such that the first electric machine 156 is also stationary (zero first machine speed, NA). Because the output speed of the final drive system 116 is at or near zero, as the speed of the second electric machine 158 increases the slip speeds of clutches C2 and C1 also increase.

As the rotating second electric machine 158 gains speed, it is converting electrical energy from the battery 122 into mechanical energy. The mechanical energy is stored in the rotating second electric machine 158, which acts like a flywheel or a mechanical battery. The mechanical or kinetic energy (KE) of the second electric machine 158 may be expressed with the equation:

$$KE = \frac{1}{2} * IB * NB^2;$$

where IB is the moment of inertia of the second electric machine 158 and NB is the rotational speed of the second electric machine 158.

During the spooling phase, the controller 180 maintains the engine speed at approximately zero. After storing sufficient mechanical energy of the second electric machine 158, the controller 180 commands a transfer phase. During the transfer phase, the stored mechanical energy from the spooling phase is transferred to the engine 112 in order to overcome the internal engine friction and cause the engine 112 to rotate.

The energy stored in the second electric machine 158 during the spooling may be transferred to start the engine 112 through either mechanical transfer or electric transfer. To withdraw the stored energy of the second electric machine 158, the controller 180 commands a deceleration of the second electric machine 158, such that the second machine speed moves toward zero.

If the energy is transferred to the engine 112 mechanically, the controller begins engaging the clutch C2, such that the slip speed of C2 moves toward zero speed. The clutch C2 is engaged by, for example, filling the clutch cylinder to apply pressure between the clutch plates drivingly connected to the first electric machine 156 and the plates drivingly connected to the first gear member 130. Engagement—or, more likely, gradual engagement—of the clutch C2 causes the stored rotational mechanical energy of the second electric machine 158 to transfer through the first electric machine 156 and the clutch C3 to the engine 112, such that the engine 112 begins to rotate. As the engine 112 increases engine speed to a starting speed, the engine 112 eventually starts.

During both the spooling and transfer phases of the inertia start, the output speed of the powertrain 110 may remain at, or near, zero because the vehicle and the final drive system 116 are not moving. The output speed may be kept at zero by the mass of the vehicle and friction within the powertrain 110 and final drive system 116, or may be kept at zero by a parking brake (not shown), pawl, or similar device recognizable to those having ordinary skill in the art. However, if the output speed is non-zero (if, for example, the vehicle is rolling) the inertia start may still be executed on the powertrain 110.

During periods of extreme cold, the power of the battery 122 may become limited, such that the battery 122 is unable to provide high power. Additionally, the engine 112 may have significantly higher friction when cold than when warm. The inertia start allows the powertrain 110 to start the engine 112 during periods in which the power required to perform an immediate start of the engine 112 with the first electric machine 156 or the second electric machine 158 is relatively high, but the power available from the battery 122 is relatively low.

The transfer phase may also include electrically transferring the stored energy of the second electric machine 158 to the engine 112. After accelerating the second electric machine 158 under low torque and low power and storing mechanical energy of the rotating second electric machine 158, the controller 180 commands a decrease in the second motor speed by generating electrical energy from the stored mechanical energy of the rotating second electric machine 158.

The power generated by slowing the second electric machine 158 is then transferred to the first electric machine 156, converted back into mechanical energy, and used to increase the engine speed sufficiently to start the engine 112. Depending upon the amount of mechanical energy stored in the second electric machine 158, additional power from the battery 122 may be transferred to the first electric machine 156 to assist in starting the engine 112. Similarly, if there is excess mechanical energy stored in the second electric machine 158, that excess energy may be stored in the battery 122 instead of transferred to the first electric machine 156. Transferring the mechanical energy stored in the second electric machine 158 to the engine 112 electrically—as opposed to transferring mechanically through slipping engagement of the clutch C2—does not require engagement of any of the clutches C1-C3 and, therefore, does not create heat energy during engagement of one of the clutches.

Figure 2:
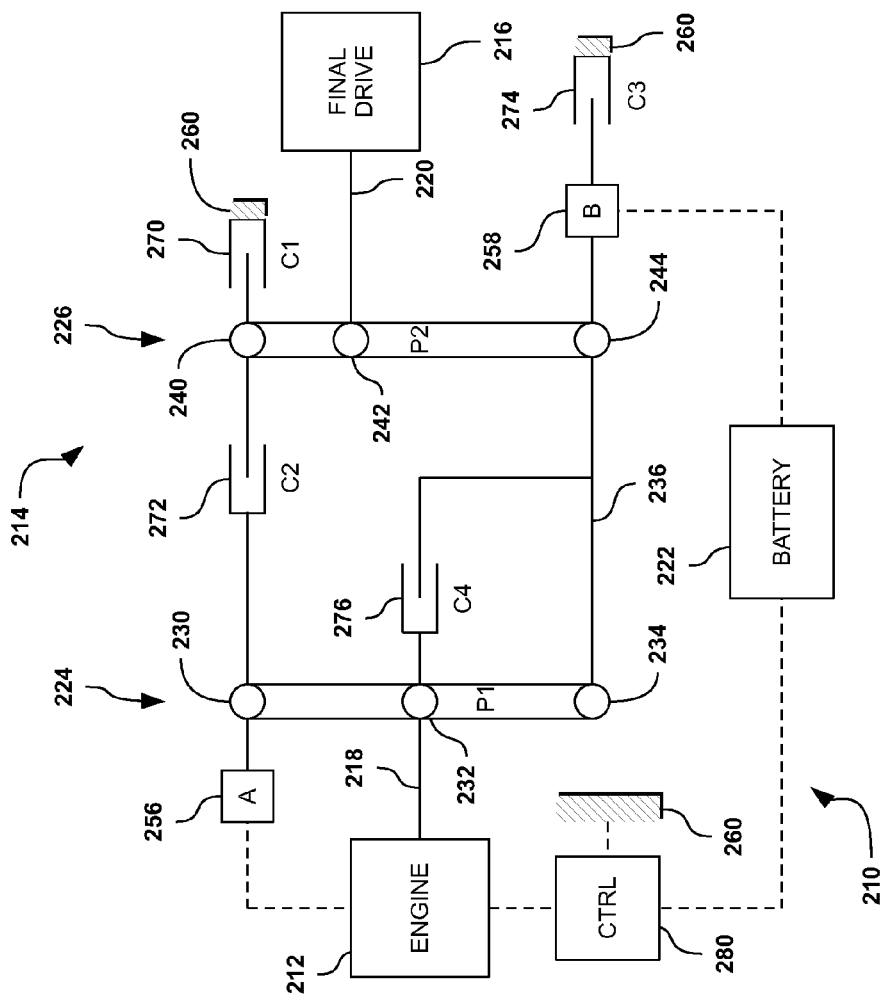
FIG. 2 is a schematic lever diagram illustration of an exemplary hybrid vehicle powertrain having two electric machines and two planetary gear sets.

Referring now to FIG. 2, and with continued reference to FIG. 1, there is shown a lever diagram depiction of an exemplary vehicle powertrain system, designated generally as 210. The powertrain 210 includes an internal combustion engine 212 selectively, drivingly connected to a hybrid transmission 214. The transmission 214 may be a multi-mode, electrically-variable transmission, and is in power flow communication with a final drive system 216.

The transmission 214 is designed to receive a portion of its driving power from the engine 212 via an input member 218. The transmission input member 218 transfers power to the transmission 214, which distributes power and torque through an output shaft 220 to the final drive system 216 to thereby propel the vehicle (not shown). The engine 212 may be any of numerous forms of petroleum-fueled prime movers, such as the reciprocating-piston type internal combustion engines, which includes spark-ignited gasoline engines and compression-ignited diesel engines. A battery 222 acts as an energy storage device for the powertrain 210 and may be a chemical battery, battery pack, or another energy storage device recognizable to those having ordinary skill in the art.

The hybrid transmission 214 utilizes one or more differential gear arrangements, such as epicyclic planetary gear sets. The configuration shown in FIG. 2 uses a first planetary gear set 224 (P1) and a second planetary gear set 226 (P2). First planetary gear set 224 and second planetary gear set 226 each include first, second and third gear members. In referring to the first and second planetary gear sets 224, 226 (P1, P2) these sets may be denoted "first" to "second" in any order in the drawings (e.g., left to right, right to left, etc.). Similarly, the first, second and third gear members of first planetary gear set 224 and second planetary gear set 226—in this description and in the claims—may be identified as "first" to "second" in any order in the drawings (e.g., top to bottom, bottom to top).

The first planetary gear set 224 is a compound planetary gear set and has three gear members: a first gear member 230, a second gear member 232, and a third gear member 234. In the configuration shown in FIG. 2, the first gear member 230 is a planet carrier member. The second gear member 232 is a ring gear and circumscribes the third gear member 234, which is a sun gear. A plurality of pinion gears are rotatably mounted on the planet carrier, second gear member 232. However, each of the first, second, and third gear members 230, 232, 234 may be any one of the gear elements—ring gear, sun gear, or planet carrier—as would be recognized by those having ordinary skill in the art.

The second planetary gear set 226 is a simple planetary gear set and includes three gear members: a first gear member 240, a second gear member 242, and a third gear member 244. In the configuration show in FIG. 2, the first, second, and third gear members 240, 242, 244 of second planetary gear set 226 are arranged similarly to those of first planetary gear set 224. The second gear member 242 (the ring gear) of P2 is continuously connected to the transmission output shaft 220.

Each of the planet carrier members described above can be either a single-pinion (simple) carrier assembly or a double-pinion (compound) carrier assembly. Embodiments with long pinions are also possible. The third gear member 234 of the first planetary gear set 224 is conjoined with (i.e., continuously connected to) the third gear member 244 of the second planetary gear set 226 by a central shaft 236. As such, these two gear members 234 and 244 are rigidly attached for common rotation.

The first gear member 230 of first planetary gear set 224 is continuously connected to a first motor/generator or first electric machine 256. Interchangeably referred to herein as motor A, the first electric machine 256 is capable of converting kinetic energy into electric energy and of converting electric energy into kinetic energy. The third gear member 244 of the second planetary gear set 226 is continuously connected to a second motor/generator or second electric machine 258, which may be interchangeably referred to herein as motor B.

The transmission 214 includes four torque transmitting mechanisms. In the exemplary embodiment depicted in FIG. 2, the torque transmitting mechanisms are friction clutches. However, other conventional clutch configurations may be employed, such as dog clutches, rocker clutches, and others recognizable to those having ordinary skill in the art. The clutches may be hydraulically actuated, receiving pressurized hydraulic fluid from a pump (not shown). Torque transmitting mechanisms acting as brakes may be selectively connected to a static element of the powertrain 210, such as a transmission housing 260 of the transmission 214.

A first torque transmitting mechanism 270—which may be interchangeably referred to as clutch C1—selectively connects the first gear member 240 of second planetary gear set 226 with a stationary member, represented in FIG. 2 by transmission housing 260. The first gear member 240 of second planetary gear set 226 is selectively connectable to the first gear member 230 of first planetary gear set 224 through the selective engagement of a second torque transmitting mechanism 272—which may be interchangeably referred to as clutch C2.

A third torque transmitting mechanism 274—which may be interchangeably referred to as clutch C3—selectively connects the third gear member 244 of second planetary gear set 226 to the transmission housing 260. The third gear member 244 of the second planetary gear set 226 and the second electric machine 258 are selectively connectable to the second gear member 232 of the first planetary gear set 224 through the selective engagement of a fourth torque transmitting mechanism 276—which may be interchangeably referred to as clutch C4.

The rotating components of transmission 214 may be coaxially oriented about the intermediate central shaft 236 or another axis. First electric machine 256 or second electric machine 258 may take on an annular configuration, permitting one or both to generally circumscribe first planetary gear set 224 and second planetary gear set 226. First electric machine 256 and second electric machine 258 are further configured to selectively operate as both a motor and a generator. For example, both first the electric machine 256 and the second electric machine 258 are capable of converting electrical energy to mechanical energy (e.g., during vehicle propulsion), and further capable of converting mechanical energy to electrical energy (e.g., during regenerative braking or during periods of excess power supply from engine 212).

A controller 280 is in communication with some or all elements of the powertrain 210. The controller 280 has a distributed controller architecture, which may be a microprocessor-based electronic control unit (ECU). The controller 280 includes a storage medium with a suitable amount of programmable memory, and is capable of storing and executing one or more algorithms to effect control of the powertrain 210. The controller 280 may include multiple control modules or components in communication with each other and the powertrain 210. The controller 280 may be further configured to execute algorithms or tasks other than those described herein.

An immediate start of the engine 212 may be executed with the powertrain 210 by, for example, locking the clutch C3 and applying sufficient torque to the first electric machine 256 to spin and start the engine 212. The powertrain 210 may also be configured for an SLI start.

The engine 212 may also be started with an inertia start, utilizing both the first electric machine 256 and second electric machine 258. The powertrain 210 is configured to effect the inertia start without engaging or disengaging any clutch (C1-C4) during the inertia start in order to effect transfer of energy during the transfer phase.

An exemplary inertia start of the powertrain 210 begins with a spooling phase. During the spooling phase, low torque is applied to the first electric machine 256 to accelerate the rotational speed of the first electric machine 256. Similarly, low torque is applied to the second electric machine 258 to accelerate the rotational speed of the second electric machine 258. However, torque is applied in opposite directions to the first electric machine 256 and the second electric machine 258, and the first electric machine 256 rotates in the opposite direction from the second electric machine 258.

None of the clutches C1-C4 needs to be applied during the spooling phase. Therefore, the powertrain 210 does not require an auxiliary pump (not shown) to be operating in order to effect hydraulic engagement of the clutches. As the second electric machine 258 begins to rotate and store mechanical energy, the slip speed of clutch C1 increases proportionally. This example assumes the output speed is fixed, although that may not be the case.

During the spooling phase, the friction of the engine 212 acts like a locked, or static, element for the first planetary gear set 224. After the first electric machine 256 and the second electric machine 258 reach sufficient speed to have stored sufficient mechanical energy to start the engine 212, the transfer phase of the inertia start begins. As the spooling phase completes, the torque to the first electric machine 256 and the second electric machine 258 is reduced to nearly zero because less, and eventually no, additional torque is needed to further accelerate the motors.

The transfer phase increases the magnitude of the torque applied to the first electric machine 256 and the second electric machine 258. Furthermore, the transfer phase decelerates at least one of the first electric machine 256 and the second electric machine 258, such that at least one of the first and second machine speeds moves toward zero. The speed of both the first electric machine 256 and the second electric machine 258 may be taken toward zero.

By changing the torque applied to the first electric machine 256 and the second electric machine 258, the controller 280 changes the torque applied to the engine 212. As at least one of the first electric machine 256 and the second electric machine 258 is decelerated, the stored mechanical energy of that motor is transferred to the engine 212 and the engine speed begins to increase. For example, providing sufficient torque to bring the second electric machine 258 to zero speed allows the first electric machine 256 to spin the first planetary gear set 224 as if the third gear member 234 were fixed.

In contrast to the mechanical inertia start implemented on the powertrain 110 of FIG. 1, which required engagement of the clutch C2 during (or prior to) the transfer phase, controlling the torque of the first electric machine 256 and the second electric machine 258 allows transfer of energy to the engine 212 without engagement of one of the clutches. All of the clutches C1-C4 of the powertrain 210 retain their same state of engagement throughout the duration of the inertia start. As used herein, state of engagement of the powertrain 210 refers collectively to the engagement and disengagement of each of the clutches C1-C4. At the beginning of the inertia start, each of the clutches C1-C4 is disengaged. Likewise, at the completion of the inertia state, each of the clutches C1-C4 remains disengaged.

As the engine speed increases sufficiently to start the engine 212, the slip speed of clutch C1 may also be brought toward zero. Bringing the slip speed to zero readies the clutch C1 for synchronous engagement, which may allow the powertrain 210 (with the engine 212 started) to be quickly placed into an electrically-variable transmission (EVT) mode and launch the vehicle (which was likely the purpose of starting the engine 212).

Figure 3:
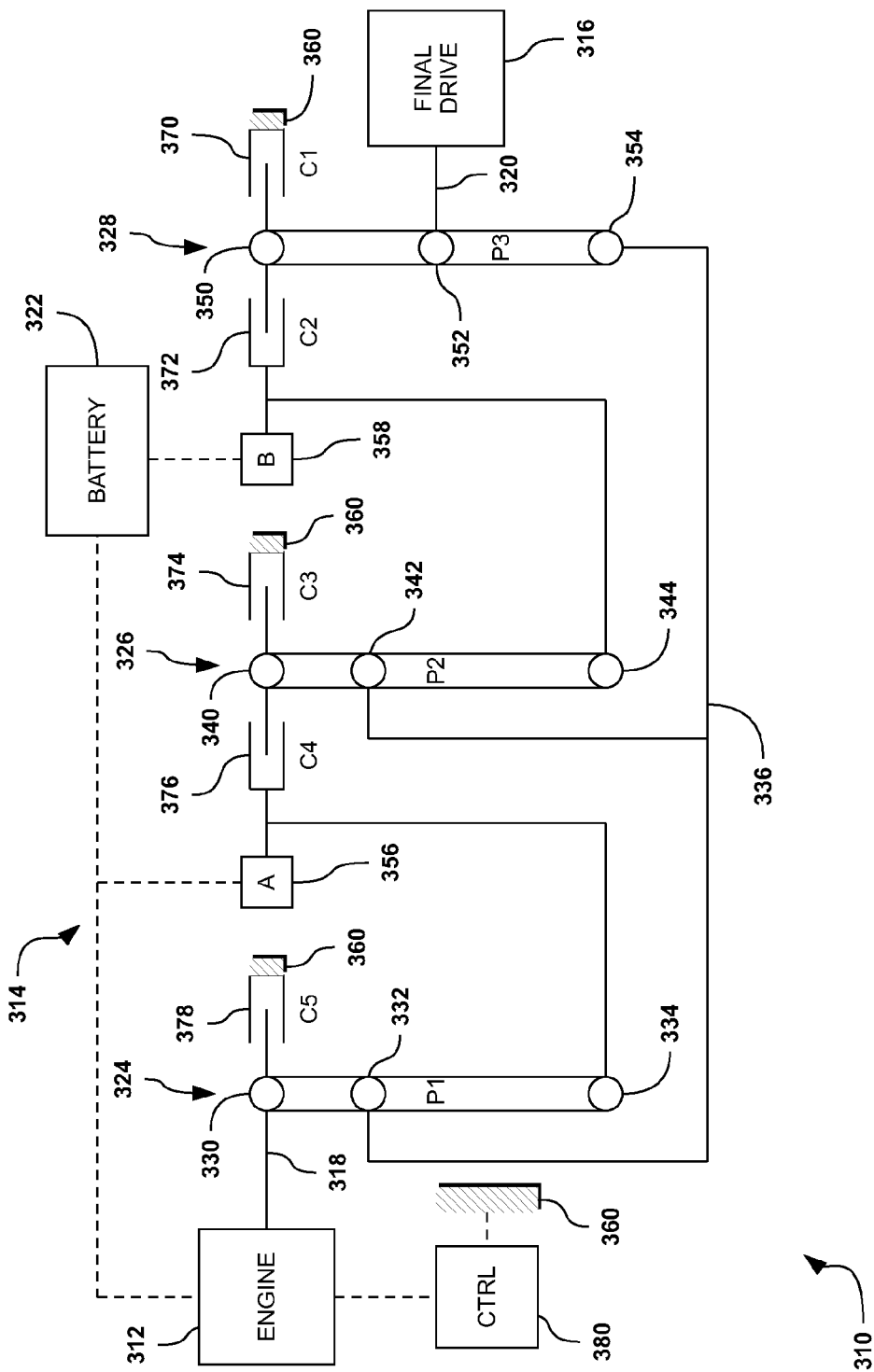
FIG. 3 is a schematic lever diagram illustration of an exemplary hybrid vehicle powertrain having two electric machines and three planetary gear sets.

Referring now to FIG. 3, and with continued reference to FIGS. 1-2, there is shown a lever diagram depiction of an exemplary vehicle powertrain system, designated generally as powertrain 310. The powertrain 310 includes an internal combustion engine 312 selectively, drivingly connected to a hybrid transmission 314. The transmission 314 may be a multi-mode, electrically-variable transmission, and is in power flow communication with a final drive system 316.

The transmission 314 is designed to receive a portion of its driving power from the engine 312 via an input member 318. The transmission input member 318 may be the engine output shaft (also referred to as a crankshaft). The input member 318 transfers power and torque to the transmission 314, which distributes power and torque through an output shaft 320 to the final drive system 316 to propel the vehicle (not shown). The engine 312 may be any of numerous forms of petroleum-fueled prime movers, such as the reciprocating-piston-type internal combustion engines, which includes spark-ignited gasoline engines and compression-ignited diesel engines. A battery 322 acts as an energy storage device for the powertrain 310 and may be a chemical battery, battery pack, or another energy storage device recognizable to those having ordinary skill in the art.

The hybrid transmission 314 utilizes one or more differential gear arrangements, such as epicyclic planetary gear sets: a first planetary gear set 324 (P1), a second planetary gear set 326 (P2), and a third planetary gear set 328 (P3). The first planetary gear set 324, second planetary gear set 326, and third planetary gear set 328 each include first, second and third gear members. In referring to the first, second and third planetary gear sets 324, 326, 328 (P1, P2, P3) these sets may be denoted "first" to "third" in any order in the drawings (e.g., left to right, right to left, etc.). Similarly, the first, second and third gear members of first planetary gear set 324, second planetary gear set 326, third planetary gear set 328—in this description and in the claims—may be identified as "first" to "third" in any order in the drawings (e.g., top to bottom, bottom to top).

The first planetary gear set 324 has three gear members: a first gear member 330, a second gear member 332, and a third gear member 334. In the configuration shown in FIG. 3, the first gear member 330 is a ring gear, and circumscribes the third gear member 334 which is a sun gear. The second gear member 332 is a planet carrier member. A plurality of pinion gears are rotatably mounted on the planet carrier, second gear member 332. Each pinion gear is meshingly engaged with both the ring gear, first gear member 330, and the sun gear, third gear member 334. Each of the first, second, and third gear members 330, 332, 334 may be any one of the gear elements—ring gear, sun gear, or planet carrier—as would be recognized by those having ordinary skill in the art.

The second planetary gear set 326 also includes three gear members: a first gear member 340, a second gear member 342, and a third gear member 344. In the configuration show in FIG. 3, the first, second, and third gear members 340, 342, 344 of second planetary gear set 326 are arranged similarly to those of first planetary gear set 324. The second gear member 352 (the ring gear) of third planetary gear set 328 is continuously connected to the transmission output shaft 320.

The third planetary gear set 328 also includes three gear members: a first gear member 350, a second gear member 352, and a third gear member 354. In this configuration, however, the second gear member 352, shown on the middle node (as viewed in FIG. 3) of the lever for third planetary gear set 328, is the ring gear. The first gear member 350 is the planet carrier in third planetary gear set 328, and is shown on the top node (as viewed in FIG. 3). The third gear member 354 is the sun gear, and is shown on the bottom node (as viewed in FIG. 3).

In the configuration of transmission 314 shown in FIG. 3, first planetary gear set 324 and second planetary gear set 326 are simple planetary gear sets, and the third planetary gear set 328 is a compound planetary gear set. However, each of the planet carrier members described above can be either a single-pinion (simple) carrier assembly or a double-pinion (compound) carrier assembly. Embodiments with long pinions are also possible.

First planetary gear set 324, second planetary gear set 326, and third planetary gear set 328 are also compounded in that the second gear member 332 of the first planetary gear set 324 is conjoined with (i.e., continuously connected to) the second gear member 342 of the second planetary gear set 326 and the third gear member 354 of the third planetary gear set 328, as by a central shaft 336. As such, these three gear members 332, 342, 354 are rigidly attached for common rotation.

The third gear member 334 of first planetary gear set 324 is continuously connected to a first motor/generator or first electric machine 356. Interchangeably referred to herein as motor A, the first electric machine 356 is capable of converting kinetic energy into electric energy and of converting electric energy into kinetic energy. The third gear member 344 of the second planetary gear set 326 is continuously connected to a second motor/generator or second electric machine 358, which may be interchangeably referred to herein as motor B.

The transmission 314 includes five torque transmitting mechanisms. In the exemplary embodiment depicted in FIG. 3, the torque transmitting mechanisms are friction clutches. However, other conventional clutch configurations may be employed, such as dog clutches, rocker clutches, and others recognizable to those having ordinary skill in the art. The clutches may be hydraulically actuated, receiving pressurized hydraulic fluid from a pump (not shown). Torque transmitting mechanisms acting as brakes may be selectively connected to a static element of the powertrain 310, such as a transmission housing 360 of the transmission 314.

A first torque transmitting mechanism 370—which may be interchangeably referred to as clutch C1—selectively connects the first gear member 350 of third planetary gear set 328 with a stationary member, represented in FIG. 3 by the transmission housing 360. The third gear member 344 of the second planetary gear set 326 and the second electric machine 358 are selectively connectable to the first gear member 350 of the third planetary gear set 328 through the selective engagement of a second torque transmitting mechanism 372—which may be interchangeably referred to as clutch C2.

A third torque transmitting mechanism 374—which may be interchangeably referred to as clutch C3—selectively connects the first gear member 340 of the second planetary gear set 326 to the transmission housing 360. The third gear member 334 of the first planetary gear set 324 and the first electric machine 356 are also selectively connectable to the first gear member 340 of the second planetary gear set 326 through the selective engagement of a fourth torque transmitting mechanism 376—which may be interchangeably referred to as clutch C4.

A fifth torque transmitting mechanism 378—which may be interchangeably referred to as clutch C5—selectively connects the input member 318 of the engine 312 and the first gear member 330 of the first planetary gear set 324 to the transmission housing 360. Clutch C5 is an input brake clutch, which selectively locks the input member 318 when the engine 312 is off. Locking input member 318 may provide more reaction for regenerative braking energy. The first and second torque transmitting mechanisms 370, 372 (C1, C2) are output clutches. The third and fourth torque transmitting mechanisms 374, 376 (C3, C4) are holding clutches.

The rotating components of transmission 314 may be coaxially oriented about the intermediate central shaft 336 or another axis. The first electric machine 356 or the second electric machine 358 may take on an annular configuration, permitting one or both to generally circumscribe the first planetary gear set 324, second planetary gear set 326, or third planetary gear set 328. The first electric machine 356 and second electric machine 358 are configured to selectively operate as both a motor and a generator. For example, both the first electric machine 356 and second electric machine 358 are capable of converting electrical energy to mechanical energy (e.g., during vehicle propulsion), and further capable of converting mechanical energy to electrical energy (e.g., during regenerative braking or during periods of excess power supply from engine 312).

A controller 380 is in communication with some or all elements of the powertrain 310. The controller 380 has a distributed controller architecture, which may be a microprocessor-based electronic control unit (ECU). The controller 380 includes a storage medium with a suitable amount of programmable memory, and is capable of storing and executing one or more algorithms to effect control of the powertrain 310. The controller 380 may include multiple control modules or components in communication with each other and the powertrain 310. The controller 380 may further be configured to execute algorithms or tasks other than those described herein.

The powertrain 310 may be configured for an immediate start of the engine 312 by, for example, locking clutch C3 and applying sufficient torque to the first electric machine 356 and the second electric machine 358 to spin and start the engine 312. The powertrain 310 may also be configured for an SLI start powered by an SLI battery (not shown).

The engine 312 may also be started with an inertia start, utilizing both the first electric machine 356 and second electric machine 358. With continued reference to FIGS. 1-3, illustrative characteristics of one exemplary inertia start are graphed in FIGS. 4A, 4B, and 4C. The powertrain 310 is configured to effect the inertia start without engaging or disengaging any clutch (C1-C5) during the inertia start, such as, for example, in order to effect transfer of energy during the transfer phase.

Figure 4A:
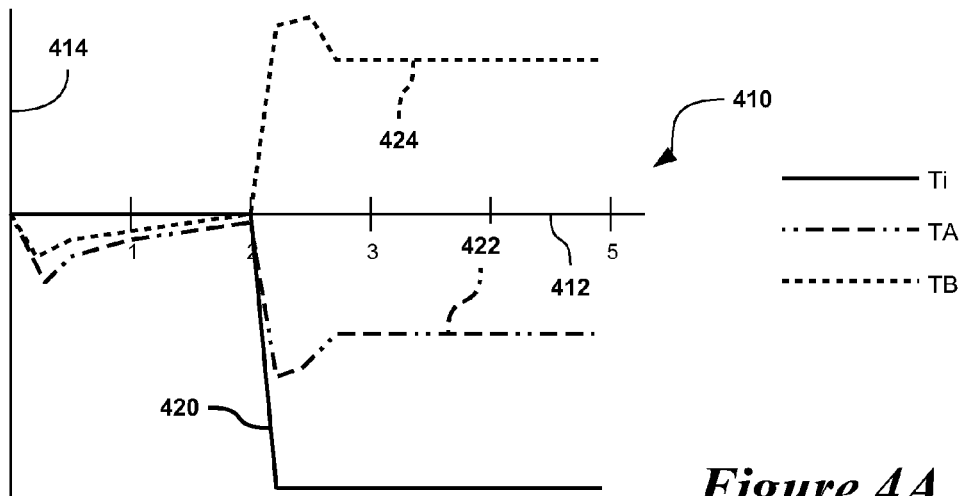
FIG. 4A is a schematic graphical illustration of the torque of the hybrid powertrain shown in FIG. 3 during an exemplary engine start process.

FIG. 4A schematically illustrates torque characteristics during the exemplary inertia start. A torque graph 410 shows a time axis 412 (the x-axis) and a torque axis 414 (the y-axis). Input torque (Ti) from the engine 312 is shown on a line 420, first machine torque (TA) from the first electric machine 356 is shown on a line 422, and second machine torque (TB) from the second electric machine 358 is shown on a line 424.

Figure 4B:
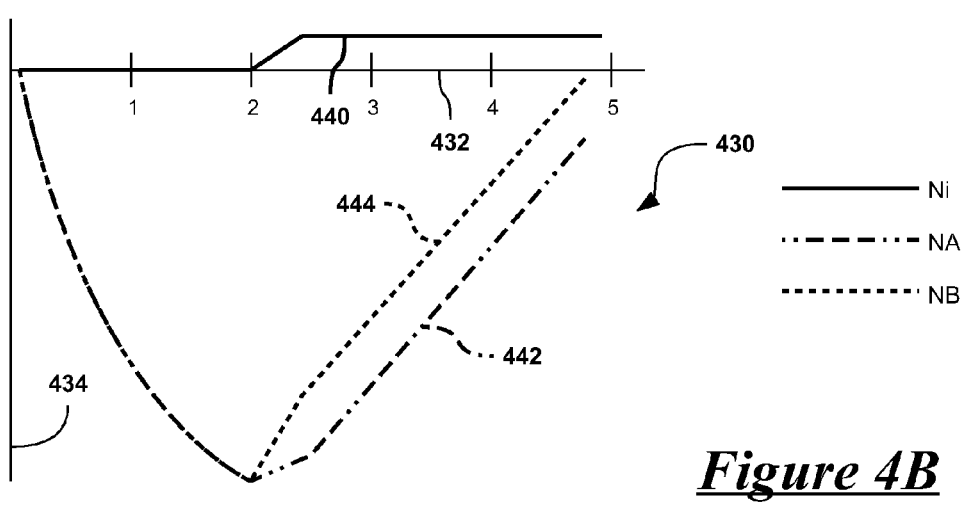
FIG. 4B is a schematic graphical illustration of the speed of the hybrid powertrain shown in FIG. 3 during the exemplary engine start process.

FIG. 4B schematically illustrates the speed characteristics during the exemplary inertia start. A speed graph 430 shows a time axis 432 (the x-axis) and a speed axis 434 (the y-axis). The time axis 432 of speed graph 430 corresponds substantially to the time axis 412 of torque graph 410. Input speed, or engine speed (Ni), of the engine 312 is shown on a line 440, first machine speed (NA) of the first electric machine 356 is shown on a line 442, and second machine speed (NB) of the second electric machine 358 is shown on a line 444. This example assumes the output speed is fixed, although that may not be the case.

Figure 4C:
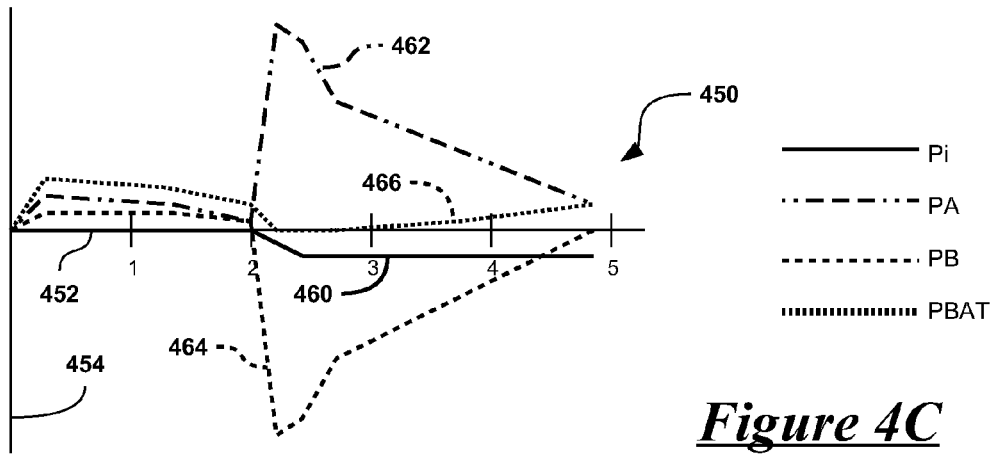
FIG. 4C is a schematic graphical illustration of the power of the hybrid powertrain shown in FIG. 3 during the exemplary engine start process.

FIG. 4C schematically illustrates power characteristics during the exemplary inertia start. A power graph 450 shows a time axis 452 (the x-axis) and a power axis 454 (the y-axis). The time axis 452 of power graph 450 corresponds substantially to the time axis 412 of torque graph 410 and the time axis 432 of speed graph 430. Input power (Pi) of the engine 312 is shown on a line 460, first machine power (PA) of the first electric machine 356 is shown on a line 462, and second machine power (PB) of the second electric machine 358 is shown on a line 464. Furthermore, power flow (PBAT) from the battery 322 is shown on a line 466.

The graphs 410, 430, and 450 shown in FIGS. 4A, 4B, and 4C are not plotted to exact scale. Therefore, for example, the proportions of input torque (Ti) values on line 420 to first machine torque (TA) values on line 422 may not be representative of exact relationships. While the time axes 412, 432, 452 correspond to one another, the exact value or units of each time segment is not defined and will depend on final configuration of the powertrain 310, controller 380, and overall control strategy of the vehicle.

The exemplary inertia start of the powertrain 310 graphically illustrated in FIGS. 4A, 4B, and 4C begins with a spooling phase. The spooling phase may generally be considered as the time period from 0 to 2.

During the spooling phase, low torque is applied to the first electric machine 356 to accelerate the rotational speed of the first electric machine 356. Similarly, low torque is applied to the second electric machine 358 to accelerate the rotational speed of the second electric machine 358. Therefore, the power flow from the battery 322 is controlled, as shown on line 466, and does not spike to the high levels required for an immediate start.

For this inertia start, torque is applied in the same direction to both the first electric machine 356 and the second electric machine 358, as shown on lines 422 and 424. The first electric machine 356 rotates in the same direction as the second electric machine 358, as shown on lines 442 and 444.

During the spooling phase, clutch C3 is engaged. Therefore, the powertrain 310 requires a pump, such as an auxiliary pump (not shown), to be operating in order to effect hydraulic engagement of the clutch C3. As the second electric machine 358 begins to rotate and store mechanical energy during the spooling phase, the slip speed of clutch C1 increases proportionally. However, the clutch C1 is not engaged during the inertia start.

The powertrain 310 is configured with at least three degrees of speed freedom when the clutch C3 is engaged. The three degrees of speed freedom are: the engine speed of the engine 312 (input speed), the output speed of the output shaft 320, and the slip speed of clutch C1. Because the output speed of the output shaft 320 is controlled by movement of the vehicle (whether rolling or parked) through the final drive system 316, controlling the first and second machine speeds of the first and second electric machines 356, 358 allows the controller 380 to control the slip speed of clutch C1 and the engine speed of engine 312.

During the spooling phase, the friction of the engine 312 acts like a locked, or static, element for the first planetary gear set 324. However, the first electric machine 356 and the second electric machine 358 are capable of providing sufficient reaction torque that the engine 312 need not supply any reaction torque (or drag) during the spooling phase. As the spooling phase completes, the torque commanded of the first electric machine 356 and the second electric machine 358 (as shown on lines 422 and 424) is reduced to nearly zero because less, and eventually no, additional torque is needed to further accelerate the first and second machine speeds.

After the first electric machine 356 and the second electric machine 358 reach sufficient speed to have stored sufficient mechanical energy to start the engine 312, the transfer phase of the inertia start begins. The transfer phase may generally be considered as the time period after time 2.

The transfer phase increases the magnitude of the torque commanded to both the first electric machine 356 and the second electric machine 358. Furthermore, the transfer phase decelerates both the first electric machine 356 and the second electric machine 358, such that both of the first and second machine speeds move, gradually, toward zero.

By changing the magnitude of the torque commanded to the first electric machine 356 and the second electric machine 358, the controller 380 changes the torque applied to the engine 312. As the first electric machine 356 and the second electric machine 358 are decelerated, the stored mechanical energy from the spooling phase is transferred to the engine 312 and the engine speed begins to increase.

In order to accelerate the engine 312, the controller 380 commands the second electric machine 358 to provide torque in the opposite direction from the commanded torque to the first electric machine 356. The reaction of the positive torque (as viewed on torque graph 410) from the second electric machine 358 and the negative torque (as viewed on torque graph 410) from the first electric machine 356 counteracts and overcomes the negative torque from the engine 312 (i.e., the drag torque restricting rotation of the engine 312).

Controlling the torque of the first electric machine 356 and the second electric machine 358 allows transfer of energy to the engine 312 without altering or changing engagement of the clutches. All of the clutches C1-C5 of the powertrain 310 retain their same state of engagement throughout the duration of the inertia start.

During a first state of engagement, prior to and during the spooling phase of the inertia start, the clutches C1, C2, C4, and C5 are not engaged and are not carrying torque. However, the clutch C3 is engaged, such that the first gear member 340 of the second planetary gear set 326 is grounded to the transmission housing 360. During a second state of engagement, during the transfer phase and actual starting of the engine 312, the clutches C1, C2, C4, and C5 remain disengaged and the clutch C3 remains engaged.

As the engine speed increases sufficiently to start the engine 312, and the second machine speed decreases toward zero, the speed the slip speed of clutch C1 is brought toward zero. Bringing the slip speed of clutch C1 to zero readies the clutch C1 for synchronous engagement, which may allow the powertrain 310 (with the engine 312 started) to be quickly placed into an electrically-variable transmission (EVT) mode and launch the vehicle or charge the battery 322 with the first and second electric machines 356, 358.

As shown in the power graph 450, if the vehicle is parked (i.e., output speed is equal to zero) during the transfer phase, there is substantially no net power output from the powertrain 310. The first electric machine 356 and second electric machine 358 may be either charging the battery 322 or discharging the battery 322 while transferring stored mechanical energy to the engine 312. If the powertrain 310 were ideally efficient, there would be zero net power output during the transfer phase, because all energy stored in the first and second electric machines 356, 358 would either be transferred to the engine 312, maintained as inertia of the first and second electric machines 356, 358, or returned to the battery 322 as electrical energy.

Figure 5:
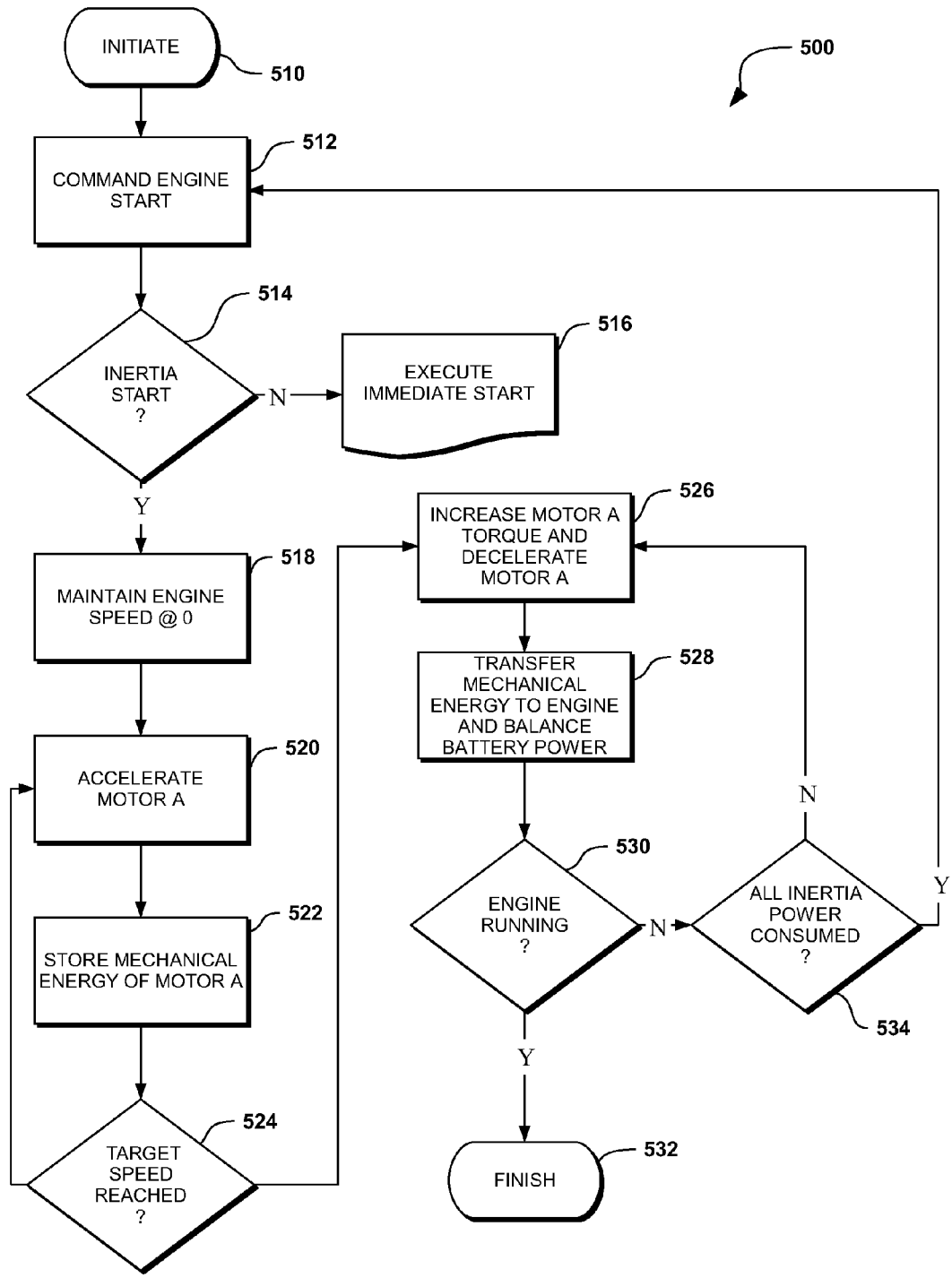
FIG. 5 is schematic flow chart of a method or algorithm for starting the engine of a hybrid powertrain.

Referring now to FIG. 5, and with continued reference to FIGS. 1-4, there is shown an algorithm 500 usable for controlling and executing inertia starts on hybrid powertrains. The algorithm 500 is shown as a schematic flow chart.

The algorithm 500 may be utilized with the some, or all, of the structure and control strategies illustrated in FIGS. 1-4, preferably executed as algorithms in the controllers 180, 280, 380. However, the algorithm 500 may also be incorporated into other hybrid powertrain arrangements, control schemes, or control structures, and has applicability beyond the powertrains 110, 210, 310 schematically illustrated in FIGS. 1-3. Furthermore, the exact order of the steps of the algorithm 500 shown in FIG. 5 is not required. Steps may be reordered, steps may be omitted, and additional steps may be included.

Algorithm 500 begins at a start or initiation step 510, during which time the algorithm 500 is monitoring operating conditions of the vehicle. Initiation may occur in response to the vehicle operator inserting the ignition key or in response to the vehicle being unlocked. Alternatively, the algorithm 500 may be running constantly or looping regardless of ignition key (or keyless) status.

The algorithm 500 proceeds further when an engine start is commanded, as shown at a step 512. At a decision step 514, the algorithm 500 determines whether conditions are present to execute an inertia start or an immediate start. If conditions will not allow the inertia start, the algorithm proceeds to step 516 to execute the immediate start. Alternatively step 514 could determine whether an SLI start is preferred and available or whether either an immediate start or an SLI start is preferred and available.

As shown at step 518, the speed of the vehicle's engine is maintained at, or near, zero. If, for example, battery power is limited due to design constraints or extreme temperature conditions and the immediate start is not available or preferable, the algorithm 500 will instead execute an inertia start and proceeds to step 520. An electric machine (such as motor A) is accelerated under low power and torque at step 520. Step 520 may further include accelerating a second electric machine (such as motor B).

At step 522, the algorithm 500 builds and stores mechanical energy with motor A. The amount of inertial energy stored is proportional to the speed of motor A and the algorithm 500 may, therefore, include a target speed for motor A. The algorithm 500 utilizes motor A as a mechanical battery (or flywheel).

Step 524 is a decision step which determines whether the speed of motor A has reached a sufficient level to end the spooling phase. If step 524 determines that the speed of motor A does not indicate that sufficient mechanical energy has been stored to start the engine, the algorithm 500 will return to step 520 to further accelerate motor A. Steps 518-524, generally, may be considered the spooling phase.

Once sufficient mechanical energy has been stored in step 522, step 524 causes the algorithm 500 to proceed to step 526. The magnitude of torque commanded to motor A is increased and motor A is decelerated, such that its speed moves toward zero, in step 526. During step 526, the deceleration of motor A is controlled to transfer energy to the engine and increase the engine to the target engine speed (the speed at which the engine will start).

At step 528, mechanical and electrical power is transferred to the engine and the engine is allowed to rotate, such that its speed accelerates away from zero. Accelerating the engine while decelerating motor A causes the stored mechanical energy of motor A to transfer to the engine. Step 528 also includes balancing the power output of the battery, motor A, and the engine. If, for example, additional power is needed to start the engine, the battery is discharged to provide further power to start the engine. However, if there is surplus power stored in the rotating motor A, the battery may be charged to recapture that energy.

If sufficient mechanical energy is transferred to the engine, the engine reaches its target rotational speed and starts. At step 530, the algorithm 500 determines whether the engine is running. If the engine is running, the algorithm proceeds to a finish step 532. Steps 524-530, generally, may be considered the transfer phase. However, additional or fewer steps may further be considered part of the transfer phase, as the designation of the spooling and transfer phases is illustrative only.

If step 530 determines that the engine is not yet running (the start is not, or cannot, complete), the algorithm proceeds to step 534. The algorithm determines whether any additional inertia power stored in the spooling phase remains at step 534. If all of the inertial power has not been consumed, the algorithm returns to step 526 to transfer that remaining energy to the engine. However, if no further inertial power remains, the algorithm aborts the inertia start and returns to step 512 the re-try either the inertia start or an immediate start.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method of operating a hybrid powertrain having a battery, an engine configured to operate at an engine speed, a first electric machine configured to operate at a first machine torque and first machine speed, and a second electric machine configured to operate at a second machine torque and second machine speed, the method comprising:
   commanding an engine start, wherein the engine speed is approximately zero;
   commanding a spooling phase, including:
      accelerating the first electric machine with the first machine torque, such that the first electric machine begins rotating and the first machine speed changes from zero to non-zero,
      maintaining the engine speed at approximately zero,
      storing mechanical energy of the rotating first electric machine;
      accelerating the second electric machine with the second machine torque, such that the second electric machine begins rotating and the second machine speed changes from zero to non-zero, and
      storing mechanical energy of the rotating second electric machine;
   commanding a transfer phase, including:
      commanding an increase in the magnitude of the first machine torque,
      decelerating the first electric machine, such that the first machine speed moves toward zero,
      commanding an increase in the magnitude of the second machine torque,
      decelerating the second electric machine, such that the second machine speed moves toward zero, and
      transferring the stored mechanical energy of the first electric machine to the engine and transferring the stored mechanical energy of the second electric machine to the engine to increase the engine speed to greater than zero, wherein increasing the engine speed starts the engine; and
   balancing a power output of the hybrid powertrain during the transfer phase by one of charging the battery and discharging the battery.

2. The method of claim 1, wherein the hybrid powertrain includes at least two torque transmitting mechanisms, and further comprising:
   placing the at least two torque transmitting mechanisms in a first state of engagement prior to the spooling phase;
   maintaining the first state of engagement during the spooling phase; and
   maintaining the first state of engagement during the transfer phase.

3. The method of claim 2, wherein accelerating the first electric machine includes rotating the first electric machine in a direction opposite the direction of rotation of the engine during the transfer phase.

4. The method of claim 3, wherein an output speed of the hybrid powertrain is a substantially zero speed during the spooling phase and the transfer phase.

5. The method of claim 3, wherein the hybrid powertrain is configured with at least three degrees of speed freedom.

6. A method of starting an internal combustion engine in a hybrid powertrain having a battery, an engine configured to operate at an engine speed, a first electric machine configured to operate at a first machine torque and first machine speed, a first torque transmitting mechanism configured to operate at a first slip speed, and a second electric machine configured to operate at a second machine torque and second machine speed, comprising:
   commanding an engine start, wherein the engine speed is approximately zero;
   commanding a spooling phase, including:
      accelerating the first electric machine with the first machine torque, such that the first electric machine begins rotating and the first machine speed changes from zero speed to a non-zero speed,
      maintaining the engine speed at approximately zero,
      accelerating the first slip speed of the first torque transmitting mechanism, such that the first slip speed moves from zero speed to a non-zero speed,
      storing mechanical energy of the rotating first electric machine,
      accelerating the second electric machine with the second machine torque, such that the second electric machine begins rotating and the second machine speed changes from zero to non-zero, and
      storing mechanical energy of the rotating second electric machine; and
   commanding a transfer phase, including:
      commanding an increase in the magnitude of the first machine torque,
      decelerating the first electric machine, such that the first machine speed moves toward zero,
      decelerating the first torque transmitting mechanism, such that the first slip speed moves toward zero speed, wherein decelerating the first slip speed of the first torque transmitting mechanism does not include engaging the first torque transmitting mechanism, and wherein decelerating the first slip speed of the first torque transmitting mechanism is controlled by torque from the first electric machine,
      commanding an increase in the magnitude of the second machine torque, and
      decelerating the second electric machine, such that the second machine speed moves toward zero, and
   transferring the stored mechanical energy of the first electric machine to the engine and transferring the stored mechanical energy of the second electric machine to the engine to increase the engine speed to greater than zero, wherein increasing the engine speed starts the engine.

7. The method of claim 6, wherein decelerating the first slip speed of the first torque transmitting mechanism is controlled by torque from the first electric machine and the second electric machine.

8. The method of claim 6, wherein an output speed of the hybrid powertrain is a substantially zero speed during the spooling phase and the transfer phase.

* * * * *